April 22, 1969 A. J. GUYON ET AL 3,439,960
METHOD FOR FABRICATING HYDROSTATIC FLUID BEARINGS
Filed Feb. 2, 1967

INVENTORS
ANDRÉ J. GUYON
DEREK JONES
MICHAEL D. SNYDER
BY
ATTORNEY

April 22, 1969     A. J. GUYON ET AL     3,439,960
METHOD FOR FABRICATING HYDROSTATIC FLUID BEARINGS
Filed Feb. 2, 1967     Sheet 3 of 3
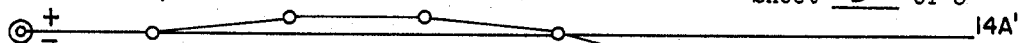
FIG.5A
FIG.5B
FIG.5C
FIG.5D
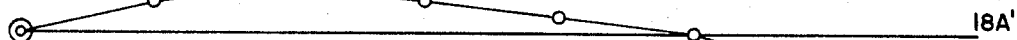
FIG.5E
FIG.5F
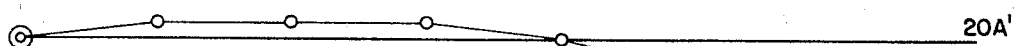
FIG.5G
FIG.5H
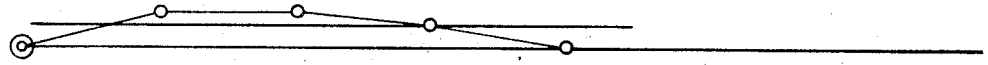
FIG.5I
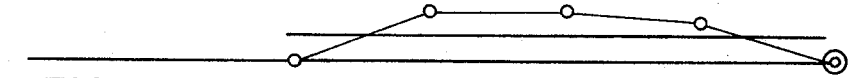
FIG.5J
FIG.5
INVENTORS
ANDRE J. GUYON
DEREK JONES
BY MICHAEL D. SNYDER
ATTORNEY

United States Patent Office 3,439,960
Patented Apr. 22, 1969

3,439,960
METHOD FOR FABRICATING HYDROSTATIC FLUID BEARINGS
Andre J. Guyon, Binghamton, N.Y., Derek Jones, London, England, and Michael D. Snyder, Chenango Bridge, N.Y., assignors to Singer-General Precision, Inc., a corporation of Delaware
Filed Feb. 2, 1967, Ser. No. 613,649
Int. Cl. F16c 1/24, 33/10, 33/74
U.S. Cl. 308—5                                    2 Claims

ABSTRACT OF THE DISCLOSURE

A hydrostatic fluid bearing made up of two groups of plural, redundant elemental bearing surfaces the respective surfaces of each group being rigidly interconnected, with such respective surfaces in confronting relation and spaced apart by a nominally constant distance over the entire lengths of the surfaces. Fluid under pressure is supplied to the space between confronting surfaces. Both translational and rotational bearings are described.

The method consists of using two sets of plural, redundant bearing surfaces, the surfaces of one set being formed on a machine tool with the surfaces fed in a first direction and the other set being formed on the same machine but with the surfaces fed in the opposite direction.

Background of the invention

This invention relates to methods of making low-cost hydrostatic bearings, which automatically compensate for deviations in the ways or guides in which they are used. Hydrostatic, or externally-pressurized bearings are frequently used in measuring instruments and other extreme-precision applications where their low coefficient of kinematic friction, zero coefficient of static friction, and long life are very important.

It has been extremely difficult and expensive in the past to provide fluid bearings of sufficient accuracy for many applications. Tolerances in straightness, parallelism, roundness and concentricity frequently must be held to a very few microinches. Such tolerances have been met only by use of very skilled personnel and much time-consuming and expensive hand-finishing. A primary object of the present invention is to provide fluid bearings which are extremely accurate in operation but which may be constructed by persons of much lesser skill without resort to the tedious and time-consuming operations of the prior art.

Summary of the invention

The present invention, which is useful for rotary as well as translatory bearings, includes, as a central concept, the use of plural redundant bearing elements which are rigidly connected together. Each one of the elements has a pair of bearing surfaces which extend nominally parallel to each other (in the case of translatory bearings—concentric with each other in rotary bearings) in a given direction, and the directions of the bearing surfaces of each such element are nominally parallel (concentric in rotary bearings) with that of the surfaces of the other elements. While extending nominally parallel, the long-term curvatures of such surfaces are noted, and each pair arranged to be substantially symmetrical about a line extending in the direction of nominal parallelism. In the case of rotary bearings, the long-term departures from circularity and concentricity are noted and each pair arranged substantially symmetrical with respect to a median circle concentric with the axis of rotation. Thus, deviations from precise rotary or linear displacement which would normally result may be made to substantially cancel each other. By providing a plurality of such pairs of surfaces, deviations due to other random errors also tend to average out.

Brief description of the drawings

FIGURE 5 is a graphical representation of certain physical and functional characteristics of a typical bearing in accordance with the present invention which will be referred to herein to assist in the exposition of the fundamental principles of the invention.

Description of the prior art

Figure 1:
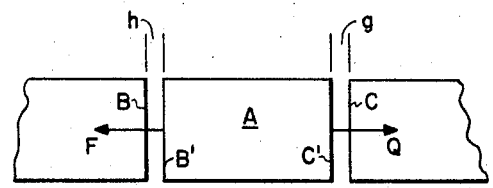
FIGURE 1 is a geometrical diagram useful in understanding the operation of a traditional fluid bearing of the prior art.

In the geometrical diagram of FIGURE 1, A represents a rigid member which is movable (in a direction perpendicular to the plane of the paper) between walls B and C of stationary structure. By the provision of fluid outlets (not shown) in sides B' and C' of member A for the flow of fluid outwardly from member A, member A will seek an equilibrium position between walls B and C at which the total force F between face B' and wall B equals the oppositely-directed force Q between face C' and wall C. If flow and pressure are equal at both faces of member A, the distance $h$ of face B' from wall B will equal the distance $g$ of face C' from wall C. If a disturbance momentarily moves member A from such an equilibrium position, member A will return to such position after removal of the disturbance. The principle explained in connection with FIGURE 1 will be seen to apply to rotary as well as to translatory bearings.

It will be readily apparent from the foregoing discussion that precision of motion achieved with prior art fluid bearings is defined and limited by the accuracy of the confronting surfaces. Actually, the travel is never as precise as the surfaces which define it.

The difficulties involved in the manufacture of high precision hydrostatic fluid bearings cannot be overemphasized. Moreover, their mass production is generally impossible as all materials exhibit some dimensional instability, and specialists capable of working within the tolerances required are few in number. No machine tool can produce a perfectly flat surface or a perfectly round profile, and each machine of a particular type has individual characteristics which are similar to, but not exactly like, those of another machine of the same type and construction. The surfaces obtained by the cutting action of a given milling machine, for example, show certain repeatable trends. All of the nominally flat surfaces produced by the machine will, generally speaking, be concave or convex, due largely to imperfections in the guiding elements, differential thermal expansion and elastic deformations in the machine. Superimposed on the overall or "long curvature" of each such nominally flat surface are shorter, substantially random variations caused by vibrations and by dust in the guides, for example.

Description of preferred embodiments

A principal novel aspect of the invention is the use of plural, redundant rigidly-interconnected hydrostatic fluid-borne bearing elements to average together the predictable deviations of such elements individually to provide linear displacements which are straighter and rotational displacements which are more accurately concentric than any of the surfaces which define them.

While the following description relates and makes reference to a gas bearing it will be understood that it applies in principle to bearings where the hydrostatic medium is a liquid rather than a gas.

Figure 2:
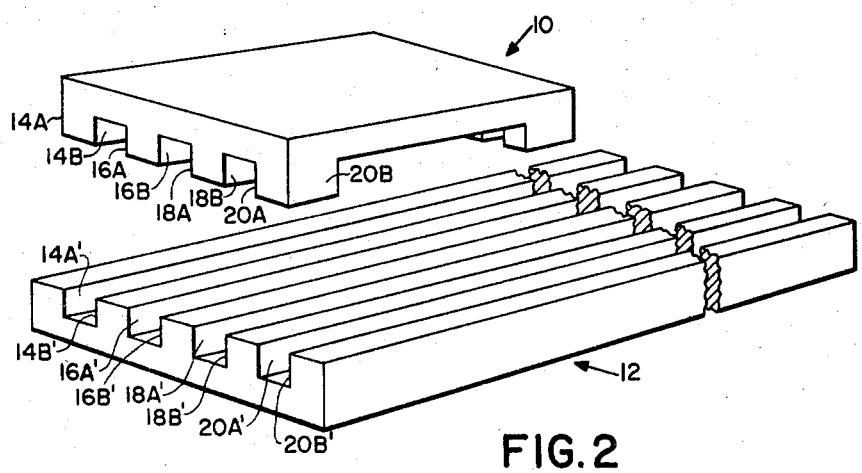
FIGURE 2 is an exploded view of a typical translatory fluid bearing constructed in accordance with the present invention.
Figure 3:
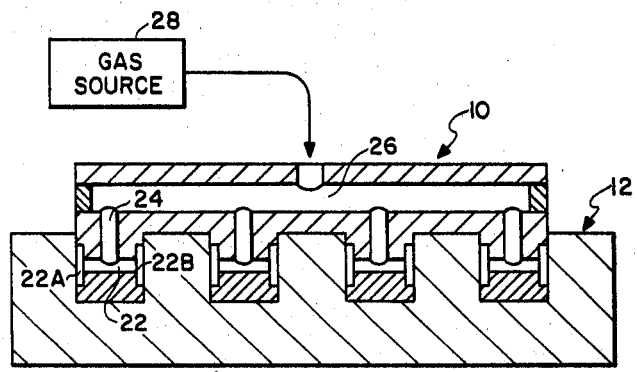
FIGURE 3 is a transverse sectional view of the fluid bearing shown in FIGURE 2 with the parts assembled in their normal relation.

A typical gas bearing constructed in accordance with the invention to provide a linear displacement is illustrated, somewhat diagrammatically and in exploded form, in FIGURE 2, and in section transverse to the direction of movement, in FIGURE 3. In the particular form illustrated, the invention is shown as applied to an assembly consisting of a movable member or slider 10 slidably supported on a fixed guide member 12. Slider 10 is generally planar in configuration and, on its under side, is formed with a series of lands and intervening grooves which define, at one end of the slider, a group of redundant elemental bearing surfaces 14A and B, 16A and B, 18A and B, 20A and B. Similar grooves and lands are provided at the other end of the slider but inasmuch as these are substantial duplicates of those already designated, these need not be referenced nor described. It will be understood that a single group of redundant bearing surfaces extending the length of slide 10 can be used and, likewise, more than two groups can be employed. Accordingly, it is pointed out that, unless the context does not permit, references herein (both previous and subsequent) to "two groups of elemental bearing surfaces" refer to respective coacting groups on members 10 and 12 and not to groups on the same member.

Guide member 12 has its upper surface formed with a series of grooves and lands complementary to those on slide 10 and defining a group of plural, redundant, elemental bearing surfaces 14A' and 14B', 16A' and 16B', 18A' and 18B', 20A' and 20B' each corresponding to similarly-numbered surfaces on the slider. With slider 10 assembled on guide member 12, as shown in FIGURE 3, the correspondingly numbered surfaces are disposed in confronting relation and are spaced apart by a small substantially constant distance; in other words, the bearing surfaces are parallel to within the degree of straightness with which it is possible or feasible to fabricate them in any given instance.

At this juncture it should be noted that the bottoms of the grooves and tops of the lands also coact to provide bearing surfaces and that the principles of the invention are equally applicable here. However, in the interest of simplicity and clarity of explanation, this description is confined to the surfaces which affect lateral deviation from a true linear path.

As appears in FIGURE 3, means are provided to supply gas under pressure to the spaces between confronting bearing surfaces. To this end, each land on slider 10 contains a through, transverse bore, such as 22, having respective counterbores 22A, 22B at each end. Bore 22 is intersected by a bore 24 which connects it to a manifold or plenum chamber 26 which, in turn, is connected, in suitable manner, to a source 28 of gas under pressure. Each of the other lands is similarly provided with bores connected to plenum 26. For a detailed description of a particular structure for supplying bearing surfaces with gas, reference may be had to U.S. Letters Patent No. 3,155,383 and 3,218,108.

To the extent that the structure of FIGURES 2 and 3 has been described, it operates in the same general manner as a conventional gas bearing, viz., gas from source 28 flows through the passages described and issues from the counterbores at the interface between confronting bearing surfaces, forming a gas film as already described in conjunction with FIGURE 1. However, because of the unique configuration and specific method of construction, the linearity of motion of slider 10 exceeds the straightness of any of the bearing surfaces as will be explained presently by reference to a typical example.

Before proceeding with this explanation, a modified form of bearing structure will be described briefly with reference to FIGURE 4; this bearing simultaneously exemplifies the two principal areas of modification within the framework of this invention: (1) The bearing fragmentally shown in FIGURE 4 provides for rotational displacement and (2) it demonstrates one of many possible configurations which the elemental bearing surfaces may take.

Figure 4:
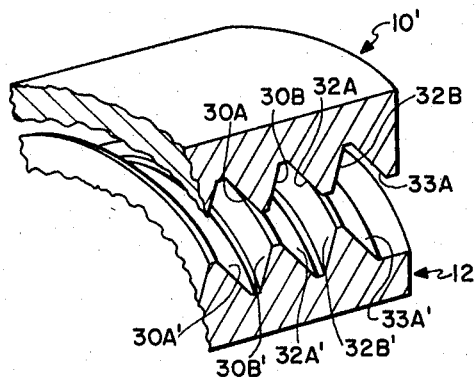
FIGURE 4 is a fragmentary exploded view of a modified form of bearing embodying the invention.

In FIGURE 4, member 10' may be considered the slider and 12' the guide. The groove and land construction is generally triangular in crosssection, thus defining confronting bearing surfaces (30A and B; 32A and B; and 33A on the slider and 30A' and B'; 32A' and B'; and 33A' on the guide member) which are in planes making acute angles with the plane of displacement.

In the case of a rotary bearing, it will be understood that the long-term deviations from the intended configuration would take the form of eccentricities and departures from absolute circularity toward an ellipsoid shape. In dealing with eccentricities, the errors should be, insofar as possible, equal and opposite; as in linear bearings, the desired results can be obtained by reversal of the stock while machining the respective surfaces. However, where the error consists of, or includes, departures from circularity yielding an ellipsoid rather than a circle, the respective axes of elongation of the coacting bearing surfaces should be at right angles to one another.

Reverting to the details of structure and method of fabrication previously alluded to, let it be assumed that a particular machine tool, say, a planer, when used to machine flat vertical surfaces characteristically imparts a small concavity to such surfaces. In accordance with the present invention, in machining guide member 12, for example, the left-hand (as viewed in FIGURE 2) set of vertical surfaces 14A', 16A', 18A', 20A' are planed in one direction, e.g., from front to rear in the referenced figure. Thereafter, the right hand set of vertical surfaces are planed in the opposite direction, i.e., from rear to front.

The results obtained with this technique are illustrated graphically in FIGURE 5 wherein curves of FIGURES 5A–5H represent the deviations from absolute linearity of the designated surfaces of a typical guide member 12, plotted with the line of symmetry for each surface. The length of the surface of the particular guide member was 14" and deviations are plotted on the scale 1"=.000400". The largest deviation is .0006" exhibited by surface 16A'.

A conventional gas bearing utilizing any one of the bearing surfaces would exhibit at least the same departure from linearity as the bearing surface itself, perhaps greater. The bearing assembly contemplated by the present invention, however, exhibits an order of magnitude smaller deviation than any of the elemental bearing surfaces.

From an inspection of FIGURES 5A–5H, it will be noted that, as a result of the machining technique described above, pairs of opposing surfaces tend to be concave with respect to each other, i.e., the groove defined by each pair of surfaces is double concave. Now, with a slider such as 10 coacting with the guide member to define plural redundant bearing surfaces, the substantially random short-term deviations are averaged out and the lateral departure of slide 10 from an absolutely straight path is markedly reduced. In the assumed example, with the deviations shown in FIGURES 5A–5H, the maximum deviation for an 8 inch long slider was only .000035 over a six inch travel. The actual deviations at either end of the guide member are plotted in FIGURES 5I and 5J. It should be noted that the scale employed for the deviations in FIGURES 5I and 5J are doubled as compared to FIGURES 5A–5H to facilitate illustration.

While the method described involves reversing the stock after machining one set of surfaces, it is within the scope of the invention to match pairs of guide members of known deviation so that the known deviations of any pair tend to add up to zero at any point along the length of such a pair of guide members.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

The embodiments of the invention in which an exclusive property or privilege is claimed are defined as follows:

1. A method of machining a hydrostatic fluid bearing member having a first set of elemental bearing surfaces spaced apart by nominally constant distances over their entire lengths and a second set of bearing surfaces, each bearing surface of the second set being in confronting relation to and uniformly spaced from a respective bearing surfaces of the first set, the method including:

feeding stock to a machine tool in one direction while forming the bearing surfaces of one set and in the opposite direction while forming the bearing surfaces of the other set.

2. A method of fabricating a hydrostatic fluid bearing comprising:

forming a plurality of similar bearing elements each having an elemental bearing surface;

selecting bearing elements in pairs which exhibit in their bearing surfaces generally equal and opposite long-term deviations from the nominal, intended configuration; and assembling selected pairs of bearing elements in rigidly connected relation with the respective bearing surfaces in confrontation and spaced by a nominally constant distance over the entire length of said surfaces.

References Cited
UNITED STATES PATENTS

| 2,605,147 | 7/1952 | Raichle et al. | 308—9 |
| 3,186,774 | 6/1965 | Wilcox | 308—5 |
| 3,353,877 | 11/1967 | Lindeboom | 308—9 |

FOREIGN PATENTS 614,816  1/1961  Italy.

LAURENCE M. GOODRIDGE, *Primary Examiner.*

U.S. Cl. X.R.

90—11